United States Patent
Shankar et al.

(10) Patent No.: US 11,943,078 B2
(45) Date of Patent: Mar. 26, 2024

(54) ASYMMETRIC HUB AND SPOKE OVERLAY NETWORK

(71) Applicant: Cisco Technology, Inc., San Jose, CA (US)

(72) Inventors: Hari Shankar, San Jose, CA (US); Rashmi Garg, Pleasanton, CA (US); Benoit Ganne, Malakoff (FR); Jerome Tollet, Paris (FR); Nathan Skrzypczak, Paris (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/860,926

(22) Filed: Jul. 8, 2022

(65) Prior Publication Data
US 2024/0015050 A1 Jan. 11, 2024

(51) Int. Cl.
*H04L 12/46* (2006.01)
*H04L 12/44* (2006.01)
(Continued)

(52) U.S. Cl.
CPC .......... *H04L 12/4683* (2013.01); *H04L 12/44* (2013.01); *H04L 45/04* (2013.01);
(Continued)

(58) Field of Classification Search
CPC ..... H04L 12/4683; H04L 12/44; H04L 45/04; H04L 45/44; H04L 45/741; H04L 2012/445
See application file for complete search history.

(56) References Cited

U.S. PATENT DOCUMENTS

2016/0080268 A1 3/2016 Anand et al.
2016/0261506 A1 9/2016 Hegde et al.
(Continued)

FOREIGN PATENT DOCUMENTS

CN 106789748 A 5/2017

OTHER PUBLICATIONS

Cisco, "Scalable Dmvpn Design And 1-25 Implementation Guide", retrieved on Nov. 2, 2018, XP055520802, Retrieved from the Internet: URL:https://www.cisco.com/c/dam/en/us/products/collateral/security/dynamic-multipoint-vpn-dmvpn/dmvpn_design_guide.pdf#wp37674 abstract sections 2-4, Dec. 31, 2007, 84 pages.
(Continued)

*Primary Examiner* — Jung H Park
(74) *Attorney, Agent, or Firm* — Lee & Hayes P.C.

(57) ABSTRACT

Techniques for a hub node, provisioned in a site of a hub and spoke overlay network, to receive, store, and/or forward network routing information associated with a spoke, and send packets directly to spoke(s) that are remote from the hub node. A first hub node may receive a network advertisement including a border gateway protocol (BGP) large community string from a first spoke local to the first hub node. The first hub node may send the BGP large community string to a second hub node remote from the first hub node. The second hub node may decode network routing information from the BGP large community string and store the network routing information locally. The second hub node may send a packet from a second spoke local to the second hub node directly to the first spoke without the data packet being routed via the first hub node.

20 Claims, 7 Drawing Sheets

(51) Int. Cl.
*H04L 45/02* (2022.01)
*H04L 45/44* (2022.01)
*H04L 45/741* (2022.01)

(52) U.S. Cl.
CPC ............ *H04L 45/44* (2013.01); *H04L 45/741* (2013.01); *H04L 2012/445* (2013.01)

(56) References Cited

U.S. PATENT DOCUMENTS

| | | |
|---|---|---|
| 2017/0230199 A1 | 8/2017 | Shen et al. |
| 2019/0036808 A1 | 1/2019 | Shenoy et al. |
| 2019/0109785 A1* | 4/2019 | Chunduri ................ H04L 45/54 |
| 2022/0103470 A1 | 3/2022 | Kulkarni et al. |
| 2022/0103471 A1* | 3/2022 | Kulkarni ............... H04L 41/122 |
| 2023/0048013 A1* | 2/2023 | Huang ................ H04L 63/0853 |

OTHER PUBLICATIONS

Search Report and Written Opinion dated Oct. 9, 2023 for PCT Application No. PCT/US2023/027099, 13 pages.

* cited by examiner

ASYMMETRIC HUB AND SPOKE OVERLAY NETWORK

TECHNICAL FIELD

The present disclosure relates generally to embedding addresses into metadata associated with spoke routes of a hub and spoke overlay network.

BACKGROUND

Service providers offer computing-based services, or solutions, to provide users with access to computing resources to fulfill users' computing resource needs without having to invent in and maintain computing infrastructure required to implement the services. These service providers often maintain networks of data centers which house servers, routers, and other devices that provide computing resources to users such as compute resources, networking resources, storage resources, database resources, application resources, security resources, and so forth. The solutions offered by service providers may include a wide range of services that may be fine-tuned to meet a user's needs. Additionally, in cloud-native environments, such as, a hub and spoke network, for example, transmission of data from one endpoint to another may require a number of hops to traverse such a mesh network without losing destination and/or source address information. While there may be mechanisms to successfully transmit data between two endpoints, there is a need to optimize these data transmissions.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1A:
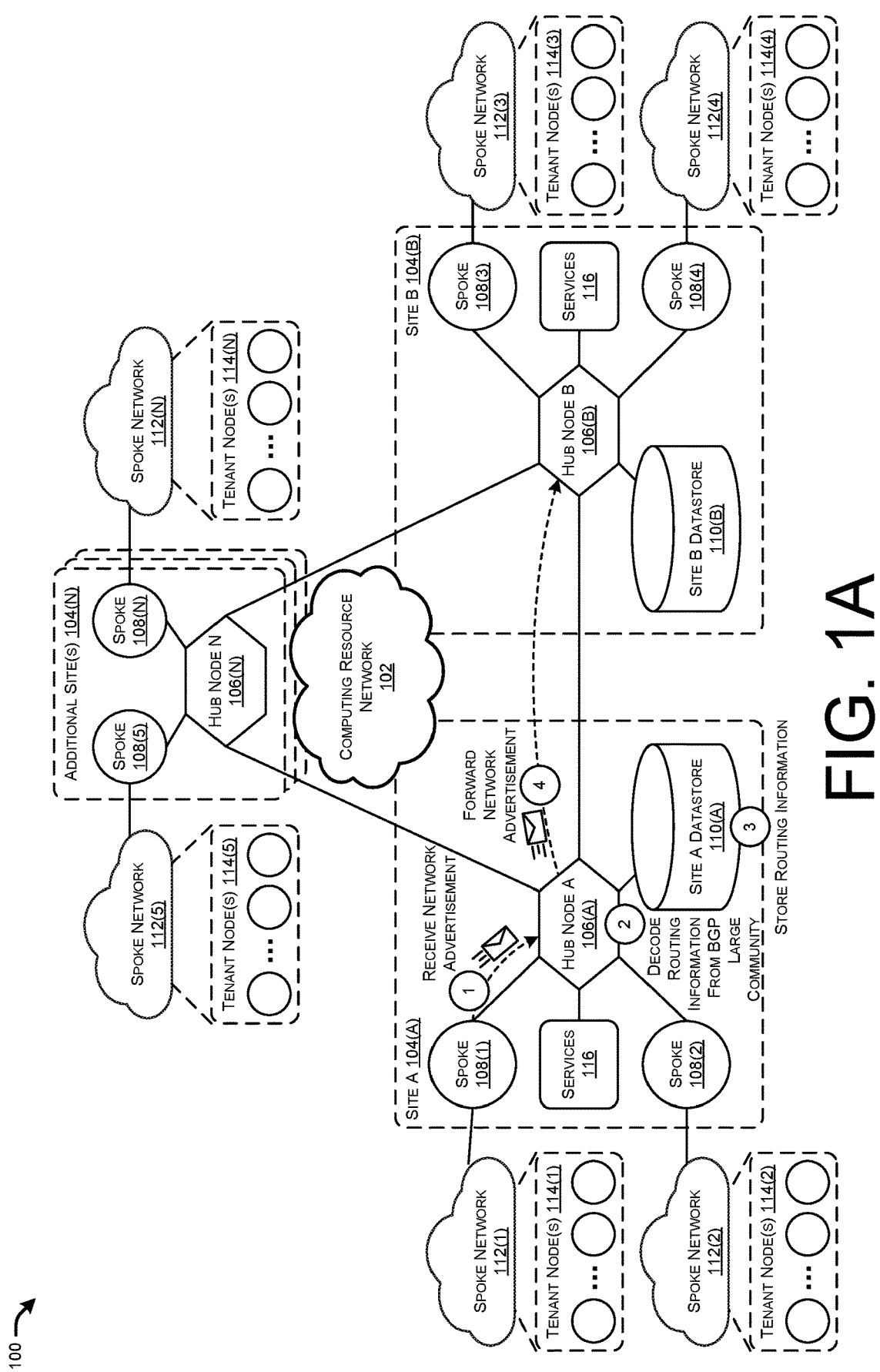
FIG. 1A illustrates a system architecture diagram of an example flow for a multi-site computing resource network (e.g., a hub and spoke overlay network) including a first hub node in a first site to receive a border gateway protocol (BGP) advertisement packet from a local spoke and forward the BGP advertisement packet to a second hub node in a second site remote from the first site.

This disclosure describes method(s) for using virtual network instance (VNI) labels (e.g., a multiprotocol label switching (MPLS) label, a virtual extensible local area network (VXLAN) label, a generic network virtualization encapsulation (GENEVE) label, etc.) in a hub and spoke overlay network to advertise network routing configurations, embed spoke addresses as metadata associated with spoke routes, and route network data. The method includes receiving, at a first hub node of a hub and spoke network and from a first spoke of the hub and spoke network, a network advertisement including a first border gateway protocol (BGP) large community associated with a first tenant node of the first spoke, wherein the first spoke is associated with the first hub node. Additionally, or alternatively, the method includes decoding, from a first portion of the first BGP large community, a first indication of a first virtual network instance (VNI) type associated with the first spoke. Additionally, or alternatively, the method includes decoding, from a second portion of the first BGP large community, a first address of a first tunnel endpoint associated with the first spoke. Additionally, or alternatively, the method includes storing, in a database associated with the first hub node, a mapping between the first VNI type and the first address of the first tunnel endpoint. Additionally, or alternatively, the method includes sending, from the first hub node and to one or more second hub nodes of the hub and spoke network, the first BGP advertisement packet, wherein the one or more second hub nodes are associated with one or more respective spokes of the hub and spoke network.

Additionally, or alternatively, the method includes receiving, at a first hub node of a hub and spoke network and from a second hub node associated with the hub and spoke network, a network advertisement including a first border gateway protocol (BGP) large community associated with a first tenant node of a first spoke of the hub and spoke network, wherein the first hub node is remote from the second hub node and the first spoke is associated with the second hub node. Additionally, or alternatively, the method includes decoding, from a first portion of the first BGP large community, a first indication of a first virtual network instance (VNI) type associated with the first spoke. Additionally, or alternatively, the method includes decoding, from a second portion of the first BGP large community, a first address of a first tunnel endpoint associated with the first spoke. Additionally, or alternatively, the method includes storing, in a database associated with the first hub node, a first mapping between the first VNI type and the first address of the first tunnel endpoint. Additionally, or alternatively, the method includes receiving, at the first hub node and from a second spoke of the hub and spoke network, a data packet to be transmitted to the first tenant node, wherein the second spoke is associated with the first hub. Additionally, or alternatively, the method includes sending, based at least in part on the first mapping, the data packet from the first hub node and to the first spoke.

Additionally, the techniques described herein may be performed by a system and/or device having non-transitory computer-readable media storing computer-executable instructions that, when executed by one or more processors, performs the method described above.

EXAMPLE EMBODIMENTS

Overlay networks may utilize various techniques to encapsulate data packets and allow for multi-tenant configurations of an overlay network, such as, for example, a hub and spoke overlay network. Hub nodes of a hub and spoke overlay network may be configured to directly communicate network traffic with other hub nodes, while spokes may be unaware of the network topology and may be configured to communicate with a particular hub node that is local to a particular spoke (e.g., a hub node in the same network site as a spoke) to facilitate the transmission of the network traffic. As such, for any spoke-to-spoke communication in the hub and spoke network, a data packet may be transmitted from a first spoke (e.g., a source spoke), deployed in a first network site, to at least a first hub node in the first network site. In some instances, where a source spoke and a destination spoke associated with a spoke-to-spoke communication are deployed in the same site (e.g., the first network site), the first hub node may transmit the data packet directly to a second spoke (e.g., the destination spoke). However, in examples where a source spoke and a destination spoke associated with a spoke-to-spoke communication are deployed in separate sites (e.g., the first spoke being in the first site and the second spoke being in a second site), the data transmission may require an additional hop through the network. For example, the first hub node may be configured to transmit the data packet to a second hub node deployed in the second site, where the second hub node may transmit the data packet to the second spoke in the second site. The return traffic may be communicated through the hub and spoke network in a similar manner, from the second spoke to the second hub, from the second hub to the first hub, and from the first hub to the first spoke.

This disclosure describes techniques for a hub node, provisioned in a network site of a multi-site computing resource network, such as, for example, a hub and spoke overlay network, to receive, store, and/or forward network routing information associated with a spoke, and send network communications directly to spoke(s) that are remote from the given hub node. In some examples, a first hub node of a hub and spoke network, provisioned in a first network site and configured to transmit network traffic associated with a first spoke provisioned in the first network site, may receive a network advertisement from the first spoke. The first hub node may be configured to decode network routing information from a border gateway protocol (BGP) large community string associated with the network advertisement and may store the network routing information in a database associated with the first hub node. In some examples, the first hub node may be configured to further advertise the network routing information to additional hub nodes in the hub and spoke network. For example, the first hub node may send the network routing information and/or the BGP large community string to a second hub node provisioned in a second site of the hub and spoke network, where the second hub node may store the network routing information in a database associated with the second hub node. Additionally, or alternatively, the second hub node may receive a packet from a source tenant node, provisioned in a second spoke associated with the second network site, to be transmitted to a destination tenant node provisioned in the first spoke. In some examples, the packet may include an inner header including next hop information for a destination tenant node provisioned in a spoke network and/or an outer header including next hop information for a given spoke node of the hub and spoke overlay network. The second hub node may receive the data packet from the second spoke and identify the network routing information associated with the first spoke that was previously stored in the database. The second hub node may be configured to leverage the network routing information associated with the first spoke and send the data packet directly to the first spoke, without intervention by the first hub node (e.g., without routing the data packet via an extra hop from the second hub node to the first hub node).

The network routing information may be received as a network advertisement. In some examples, the network advertisement may be configured as a data packet, a network advertisement packet, such as, for example, a border gateway protocol (BGP) advertisement packet, and/or an application programming interface (API) call, such as, for example, a representational state transfer (REST) API call including details for configuring a given spoke network with the computing resource network. Additionally, or alternatively, the network advertisement may comprise a BGP large community string encoded with various network routing information. The BGP large community string may comprise various portions encoded with the information, such as, for example, a first 4-byte portion encoded with a tenant virtual network instance (VNI) associated with a tenant node provisioned in a spoke network, a second 4-byte portion encoded with an indication of a VNI type associated with a spoke network, and/or a third 4-byte portion encoded with an address associated with the spoke network (e.g., an internet protocol (IP) address associated with the spoke network and/or a tunnel endpoint associated with the spoke network).

In some examples, when a spoke and/or a tenant node provisioned in a spoke connects to a site of the hub and spoke network (e.g., comes online), the spoke may transmit network routing information associated with the spoke and/or the tenant node to a hub node provisioned in the same site of the hub and spoke network (e.g., the hub node local to the spoke). For example, one or more routing device(s) associated with a given spoke network may receive a tenant VNI for a given tenant node in the spoke network and may encode the first 4-byte portion of the BGP large community string with the tenant VNI. In some examples, a tenant VNI may be received from a hub node provisioned locally to a given spoke and/or from a database storing tenant VNIs. The tenant VNI may be configured as a VNI label used for tenant traffic, such as, for example, MPLS, VXLAN, GENEVE, and/or any other network overlay protocol. Additionally, or alternatively, the one or more routing device(s) may encode the second 4-byte portion of the BGP large community string with an indication of the VNI type of the given spoke, such as, for example, MPLS, VXLAN, GENEVE, and/or any other network overlay protocol. Additionally, or alternatively, the one or more routing device(s) may encode the third 4-byte portion of the BGP large community string with an IP version 4 (IPv4) address and/or an identifier of an IP version 6 (IPv6) address of a network tunnel endpoint associated with the given spoke (or the one or more routing devices provisioned in the given spoke network). In examples where the network tunnel endpoint is an IPv6 address, the IPv6 address may be mapped to a 4-byte identifier. In such examples, a given hub node may be configured to perform a lookup using the 4-byte identifier to determine the IPv6 address of the tunnel endpoint based on the VNI type included in the second portion of the BGP large community string indicating that the VNI type of a given spoke is a VNI configured for IPv6 routing.

A hub node may be configured to decode the network routing information from the various portions of the BGP large community string. In some examples, while decoding the network routing information, a hub node may be configured to assume that the IP address included in the third portion of the BGP large community string is an IPv4 address, unless an indication is otherwise provided. A hub node may be configured to determine such an indication by decoding the second portion of the BGP large community, and determining, based at least in part on the VNI type, that the tunnel endpoint associated with given spoke is an IPv6 address. In such examples, a hub node may then perform a lookup, based on a 4-byte identifier encoded in the third portion of the BGP large community string (in place of the IPv4 address) to determine the IPv6 address associated with the tunnel endpoint of the given spoke network.

Additionally, or alternatively, a hub node may be configured to store the network routing information associated with a given spoke and/or a given tenant of the given spoke as a mapping between the tenant VNI, the indication of the VNI type of the given spoke, and/or the address associated with the spoke network. In some examples, the mapping may include only the indication of the VNI type of the given spoke and the address associated with the spoke network. By storing the network routing information in this way, a hub node may be configured to send a data packet from a source node provisioned in a first spoke that is local to the hub node (e.g., provisioned in the same network site) directly to a second spoke that is remote from the hub node and hosting a destination node associated with the packet. For example, the hub node may identify, based on the mapping, the tenant VNI associated with the destination node, the VNI type associated with the second spoke, and the address associated with the spoke network, and utilize the network routing information to send the data packet directly to the second spoke, thus eliminating an additional network hop by foregoing sending the data packet to a remote hub node associated with the second spoke.

As previously described, hub nodes associated with the hub and spoke network may be configured to advertise the network routing information received from a given spoke to each of the additional hub nodes in the hub and spoke network. By configuring each of the hub nodes to forward advertisements to each of the hub nodes in the hub and spoke network, each hub in the network may be configured to read and/or decode the BGP large community string of each route and learn the VNI type and/or IP address of a given spoke for the prefix of the route.

As described herein, a computing-based, cloud-based solution, hub node, and/or spoke network can generally include any type of resources implemented by virtualization techniques, such as containers, virtual machines, virtual storage, and so forth. Further, although the techniques described as being implemented in data centers and/or a cloud computing network, the techniques are generally applicable for any network of devices managed by any entity where virtual resources are provisioned. In some instances, the techniques may be performed by a schedulers or orchestrator, and in other examples, various components may be used in a system to perform the techniques described herein. The devices and components by which the techniques are performed herein are a matter of implementation, and the techniques described are not limited to any specific architecture or implementation.

The techniques described herein provide various improvements and efficiencies with respect to using BGP large community strings to encode network routing information and route network data more efficiently in a multi-site network with a multi-tenant overlay. For instance, the techniques described herein may allow for hub nodes in a hub and spoke overlay network to share network routing information associated with spokes and/or tenants provisioned locally to a given hub node (e.g., provisioned in the same site of the hub and spoke overlay network) with other hub nodes that are remote from the spokes and/or tenants. By encoding network routing information specific to a given spoke and/or tenant node into a BGP large community string associated with a packet, a local hub node may decode the network routing information, store the network routing information locally, and forward the network routing information to remote hub nodes in the hub and spoke network, allowing for the remote hub nodes to read the BGP large community string of each route and learn network specific information required to route packets directly to a given remote spoke (e.g., a VNI associated with the remote spoke, and/or an address of the remote spoke and/or a tunnel endpoint associated with the remote spoke). Additionally, by advertising network routing information associated with local spokes to remote hub nodes, a hub node, provisioned in a network site of a hub and spoke overlay network that is remote from a given spoke, may be configured to send packets directly to the given spoke without intervention by the remote hub node associated with the given spoke (e.g., without sending the packet to the remote hub node). As such, by directly sending data packets from a hub node in a first site to a spoke in a second site that is remote from the hub node, an extra hop in the routing of the packet may be eliminated, and computing and/or network resources may be preserved.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1B:
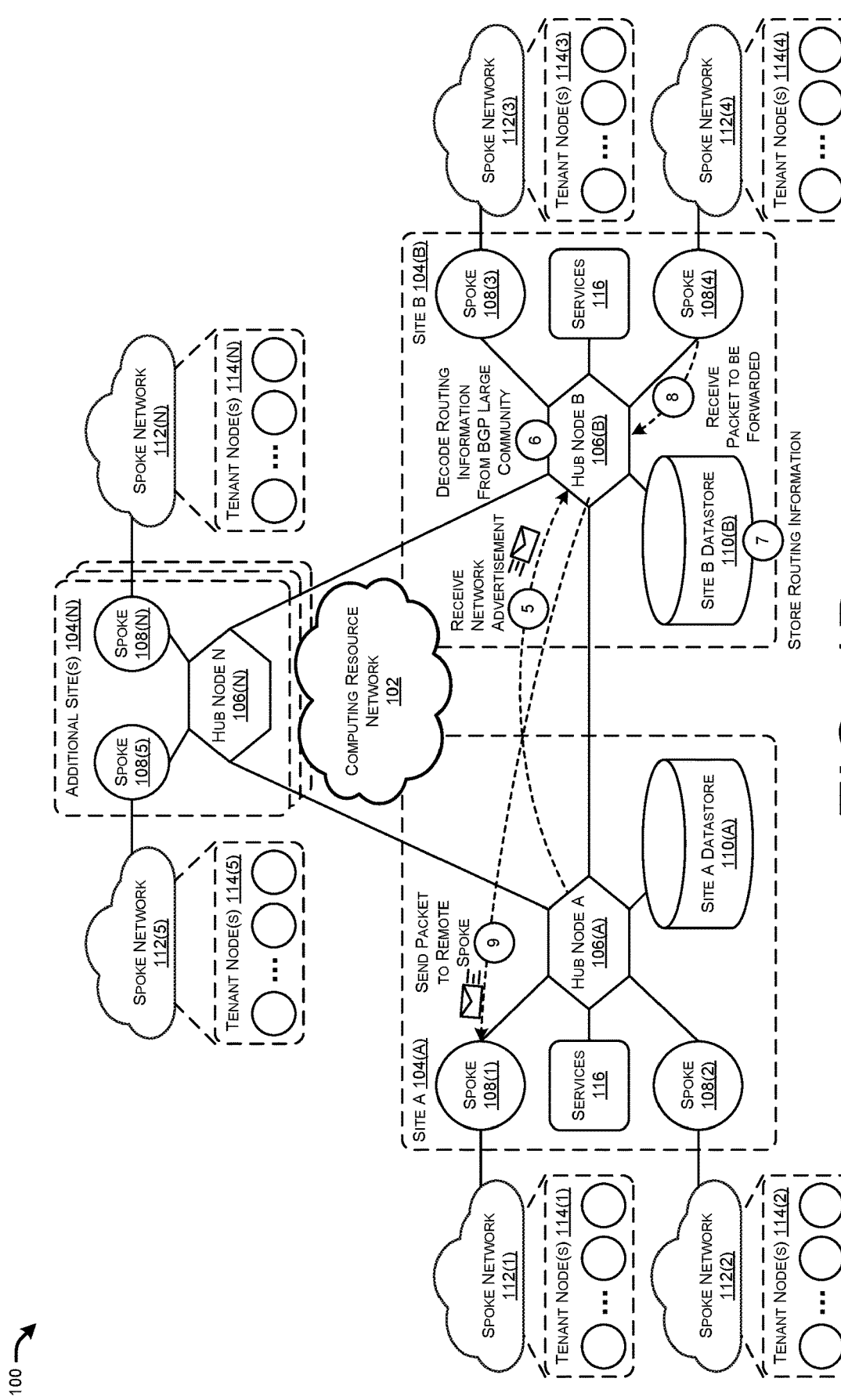
FIG. 1B illustrates a system architecture diagram of an example flow for a multi-site computing resource network including a first hub node in a first site having local spokes connected thereto to send data packets from a source node of a local spoke directly to a destination node of a remote spoke connected to a second hub node in a second site.

FIGS. 1A and 1B illustrate a system architecture diagram 100 of an example flow for a multi-site computing resource network 102 including one or more network sites 104 including a respective hub node 106, respective spokes 108, and/or a respective datastore 110, where the hub nodes 106 may be configured to advertise BGP advertisement packet(s) including network routing information and received from respective spokes 108 local to a given hub node 106 to other hub nodes 106 in the network 102, where the network routing information may be stored in a respective datastore 110 and utilized to send a packet from a given hub node 106 directly to a spoke 108 that is remote from the given hub node 106.

FIG. 1A illustrates an example system-architecture diagram 100 and an example flow for a computing resource network 102 (e.g., a hub and spoke overlay network) including at least a first hub node 106(A) provisioned in a first site 104(A) to receive a border gateway protocol (BGP) advertisement packet from a local spoke 108(3) and forward the BGP advertisement packet to a second hub node 106(B) provisioned in a second site 104(B) that is remote from the first site 104(A).

The computing resource network 102 may comprise one or more data centers that include various networking components, such as, a network controller and/or network switches (also referred to as nodes) operating on physical servers. In some examples, physical server(s) may host one or more virtual machines. Each virtual machine may be configured to execute one of various operations and act as one or more virtual components for the computing resource network 102, such as, for example, computing-based resources. In some examples, the physical server(s) may host any number of virtual machines. In some examples, physical server(s) in the computing resource network 102 may host the various network components of the computing resource network 102, such as, for example, a hub node 106, a spoke 108(1)-(N), a spoke network 112(1)-(N), and/or one or more tenant node(s) 114(1)-(N), where N may be any integer greater than 1.

Each of the spokes 108 may provide a hub node 106 of a given site 104 access to a spoke network 112 hosting one or more tenant node(s) 114. For example, a first hub node 106(A) provisioned in a first site 104(A) of the computing resource network 102 may be configured to route network traffic associated with a first spoke 108(1) and/or a second spoke 108(2) provisioned in the first site 104(A), such as, for example, network traffic originating from and/or destined to one or more tenant nodes 114(1), 114(2) hosted in one or more spoke networks 112(1), 112(2). Additionally, or alternatively, a second hub node 106(B) provisioned in a second site 104(B) of the computing resource network 102 may be configured to route network traffic associated with a third spoke 108(3) and/or a fourth spoke 108(4) provisioned in the second site 104(B), such as, for example, network traffic originating from and/or destined to one or more tenant nodes 114(3), 114(4) hosted in one or more spoke networks 112(3), 112(4). Additionally, or alternatively, the first hub node 106(A), the second hub node 106(B), and/or one or more third hub node(s) 106(N) may be communicatively coupled, such that they are configured to send network traffic to a given hub node 106 configured to route the network traffic to a destination spoke 110 provisioned in the same network site of the given hub node 106.

Additionally, or alternatively, each of the sites 104 may offer one or more services 116 implemented by way of a hub node 106 provisioned in a given site 104. In some examples, the one or more services 116 may comprise a deep packet inspection (DPI) service, a cloud-delivered firewall (CDFW) service, a network address translation (NAT) service, a secure web gateway (SWG) service, a domain name service (DNS) layer security service, and/or a cloud access security broker (CASB) service.

Take, for example, the computing resource network 102 configured as a hub and spoke overlay multiprotocol label switching (MPLS) network. As previously described, hub node A 106(A) may be configured to route network traffic associated with one or more spoke(s) 108(1), 108(2) provisioned in network site A 104(A) and/or hub node B 106(B) may be configured to route network traffic associated with one or more spoke(s) 108(3), 108(4) provisioned in network site B 104(B). That is, network traffic, destined for one or more tenant nodes 114(1), 114(2) hosted in respective spoke network(s) 112(1), 112(2) connected to hub node A 106(A) by way of the spoke(s) 108(1), 108(2) provisioned in site A 104(A) and from one or more tenant nodes 114(3)-(N) hosted in respective spoke network(s) 112(3)-(N) and connected to respective hub node(s) 106(B), 106(N) by way of the spoke(s) 108(3)-(N), is received at hub node A 106(A) and routed to the spoke 108 connected to the spoke network 112 hosting the destination tenant node 114. In other words, network traffic traversing the hub and spoke overlay network originating in site B 104(B) and destined for site A 104(A), is routed based on a first hop from the originating spoke 108(3), 108(4) to hub node B 106(B), a second hop from hub node B 106(B) to hub node A 106(A), and a third hop from hub node A 106(A) to the destination spoke 108(1), 108(2). However, by configuring a networking device associated with a spoke 108 to encode a border gateway protocol (BGP) large community string with network routing information associated with the spoke 108 and/or a tenant node 114, a hub node 106 may utilize the network routing information to send packets directly to a remote spoke (e.g., from hub node A 106(A) to spoke 108(3)), thus eliminating the need for 3 network hops to route network traffic across network sites of the hub and spoke overlay network.

For example, hub node A 106(A) provisioned in network site A 104(A) and configured to transmit network traffic associated with a first spoke 108(1), may receive a network advertisement from the first spoke 108(1). In some examples, the network advertisement may be configured as a data packet, a BGP advertisement packet, and/or an application programming interface (API) call, such as, for example, a representational state transfer (REST) API call including details for configuring a given spoke network 112 with the computing resource network 102. Additionally, or alternatively, the network advertisement may comprise a BGP large community string. Additionally. or alternatively, the packet may be configured as a data packet including a BGP large community string. The hub node A 106(A) may be configured to decode network routing information from the BGP large community string associated with the packet and may store the network routing information in the site A database 110(A) provisioned in site A 104(A). In some examples, hub node A 106(A) may be configured to further advertise the network routing information to additional hub nodes (e.g., hub node B 106(B) and/or one or more hub node(s) N 106(N)) in the hub and spoke network. For example, hub node A 106(A) may send the network routing information and/or the BGP large community string to hub node B 106(B) provisioned in site B 104(B) of the hub and spoke network, where hub node B 106(B) may decode and/or store the network routing information the site B database 110(B) provisioned in site B 104(B). Additionally, or alternatively, hub node B 106(B) may receive a packet from a source tenant node 114(3) hosted in a spoke network 112(3) connected to a second spoke 108(3) provisioned in site B 104(B), to be transmitted to a destination tenant node 114(1) hosted in a spoke network 112(1) connected to the first spoke 108(1). In some examples, the packet may include an inner header including next hop information for a destination tenant node 114(1) provisioned in a spoke network 112(1) and/or an outer header including next hop information for a given spoke node 108(1) of the hub and spoke overlay network 102. Hub node B 106(B) may receive the data packet from the second spoke 108(3) and identify the network routing information associated with the first spoke 108(1) that was previously stored in the site B database 110(B). Hub node B 106(B) may be configured to leverage the network routing information associated with the first spoke 108(1) and send the data packet directly to the first spoke 108(1), without intervention by hub node A 106(A) (e.g., without routing the data packet via an extra hop from the hub node B 106(B) to hub node A 106(A)).

The network routing information may be received as a data packet and/or a network advertisement packet, such as, for example, a border gateway protocol (BGP) advertisement packet comprising a BGP large community string encoded with various network routing information. The BGP large community string may comprise various portions encoded with the information, such as, for example, a first 4-byte portion encoded with a tenant VNI associated with a tenant node 114 provisioned in a spoke network 112, a second 4-byte portion encoded with an indication of a virtual network instance (VNI) type associated with a spoke 108 and/or a spoke network 112, and/or a third 4-byte portion encoded with an address associated with the spoke 108 and/or the spoke network 112 (e.g., an internet protocol (IP) address associated with the spoke network and/or a tunnel endpoint associated with the spoke network).

In some examples, when a spoke 108 and/or a tenant node 114 provisioned in a spoke network 112 connects to a site 104 of the hub and spoke network (e.g., comes online), the spoke 108 may transmit network routing information associated with the spoke 108 and/or the tenant node 114 to a hub node 106 provisioned in the same site 104 of the hub and spoke network (e.g., hub node A 104(A) and spoke 108(1)). For example, one or more routing device(s) associated with a given spoke network 112 may receive a tenant VNI for a given tenant node 114 in the spoke network and may encode the first 4-byte portion of the BGP large community string with the tenant VNI. In some examples, a tenant VNI may be received from a hub node 106 provisioned locally to a given spoke 108 and/or from a database storing tenant VNIs. The tenant VNI may be configured as a VNI label used for tenant traffic, such as, for example, MPLS, VXLAN, GENEVE, and/or any other network overlay protocol. Additionally. or alternatively, the one or more routing device(s) may encode the second 4-byte portion of the BGP large community string with an indication of the VNI type of the given spoke 108, such as, for example, MPLS. VXLAN, GENEVE, and/or any other network overlay protocol. Additionally, or alternatively, the one or more routing device(s) may encode the third 4-byte portion of the BGP large community string with an IP version 4 (IPv4) address and/or an identifier of an IP version 6 (IPv6) address of a network tunnel endpoint associated with the given spoke 108 (or the one or more routing devices provisioned in the given spoke network 112). In examples where the network tunnel endpoint is an IPv6 address, the IPv6 address may be mapped to a 4-byte identifier. In such examples, a given hub node 106 may be configured to perform a lookup using the 4-byte identifier to determine the IPv6 address of the tunnel endpoint based on the VNI type included in the second portion of the BGP large community string indicating that the VNI type of a given spoke 108 is a VNI configured for IPv6 routing.

A hub node 106 may be configured to decode the network routing information from the various portions of the BGP large community string. In some examples, while decoding the network routing information, a hub node 106 may be configured to assume that the IP address included in the third portion of the BGP large community string is an IPv4 address, unless an indication is otherwise provided. A hub node 106 may be configured to determine such an indication by decoding the second portion of the BGP large community, and determining, based at least in part on the VNI type, that the tunnel endpoint associated with given spoke 108 is an IPv6 address. In such examples, a hub node 106 may then perform a lookup, based on a 4-byte identifier encoded in the third portion of the BGP large community string (in place of the IPv4 address) to determine the IPv6 address associated with the tunnel endpoint of the given spoke network 112.

Additionally, or alternatively, a hub node 106 may be configured to store the network routing information associated with a given spoke 108 and/or a given tenant 114 of the given spoke 108 as a mapping between the tenant VNI, the indication of the VNI type of the given spoke 108, and/or the address associated with the spoke 108. Additionally, or alternatively, the mapping may include only the indication of the VNI type of the given spoke 108 and the address associated with the spoke 108. By storing the network routing information in this way, a hub node 106(A) may be configured to send a data packet, from a source node 114(1) provisioned in a first spoke 108(1), directly to a second spoke 108(3) that is remote from the hub node 106(A) and hosting a destination node 114(3) associated with the packet. For example, the hub node 106(A) may identify, based on the mapping, the tenant VNI associated with the destination node 114(3), the VNI type associated with the second spoke 108(3), and the address associated with the second spoke 108(3), and utilize the network routing information to send the data packet directly to the second spoke 108(3), thus eliminating an additional network hop by foregoing sending the data packet to the hub node 106(B) associated with the second spoke 108(3).

At "1," hub node A 106(A) provisioned in network site A 104(A) and configured to transmit network traffic associated with a first spoke 108(1), may receive a network advertisement from the first spoke 108(1). In some examples, the network advertisement may be configured as a data packet, a BGP advertisement packet, and/or an application programming interface (API) call, such as, for example, a representational state transfer (REST) API call including details for configuring a given spoke network 112 with the computing resource network 102. Additionally, or alternatively, the network advertisement may include a BGP large community string. The BGP large community string may comprise various portions encoded with the information, such as, for example, a first 4-byte portion encoded with a tenant VNI associated with a tenant node 114(1) provisioned in the first spoke network 112(1), a second 4-byte portion encoded with an indication of a virtual network instance (VNI) type associated with the first spoke 108(1) and/or the first spoke network 112(1), and/or a third 4-byte portion encoded with an address associated with the first spoke 108(1) and/or the first spoke network 112(1) (e.g., an internet protocol (IP) address associated with the first spoke network 112(1) and/or a tunnel endpoint associated with the first spoke network 112(1)).

At "2," hub node A 106(A) may decode the network routing information from various portions of the BGP large community string. In some examples, while decoding the network routing information, hub node A 106(A) may be configured to assume that the IP address included in the third portion of the BGP large community string is an IPv4 address, unless an indication is otherwise provided. Hub node A 106(A) may be configured to determine such an indication by decoding the second portion of the BGP large community, and determining, based at least in part on the VNI type, that the tunnel endpoint associated with the first spoke 108(1) is an IPv6 address. In such examples, hub node A 106(A) may then perform a lookup, based on a 4-byte identifier encoded in the third portion of the BGP large community string (in place of the IPv4 address) to determine the IPv6 address associated with the tunnel endpoint of the first spoke network 112(1).

At "3," hub node A 106(A) may be configured to store the network routing information associated with the first spoke 108(1) and/or the tenant node 114(1) provisioned in the first spoke 108(1) as a mapping between the tenant VNI, the indication of the VNI type of the first spoke 108(1), and/or the address associated with the first spoke 108(1). Additionally, or alternatively, the mapping may include only the indication of the VNI type of the first spoke 108(1) and the address associated with the first spoke 108(1).

At "4," hub node A 106(A) may be configured to further advertise the network routing information to additional hub nodes (e.g., hub node B 106(B) and/or one or more hub node(s) N 106(N)) in the hub and spoke network. For example, hub node A 106(A) may send the network routing information and/or the BGP large community string to hub node B 106(B) provisioned in site B 104(B) of the hub and spoke network.

In some examples, the example flow may continue from step "4" of FIG. 1A to step "5" of FIG. 1B. Additionally, or alternatively, the example flow from FIG. 1A may be executed simultaneously with the example flow of FIG. 1B.

FIG. 1B illustrates an example system-architecture diagram 100 and an example flow for a computing resource network 102 (e.g., a hub and spoke overlay network) including at least a first hub node 106(A) provisioned in a first site 104(A) and a second hub node 106(B) provisioned in a second site 104(B) having local spokes 108(3), 108(4) connected thereto to send data packets from a source node 114(3), 114(4) of one of the local spoke(s) 108(3), 108(4) directly to a destination node 114(1), 114(2) of a remote spoke 108(1), 108(2) connected to the first hub node 106(A) in the first site 104(A).

The computing resource network 102 may comprise one or more data centers that include various networking components, such as, a network controller and/or network switches (also referred to as nodes) operating on physical servers. In some examples, physical server(s) may host one or more virtual machines. Each virtual machine may be configured to execute one of various operations and act as one or more virtual components for the computing resource network 102, such as, for example, computing-based resources. In some examples, the physical server(s) may host any number of virtual machines. In some examples, physical server(s) in the computing resource network 102 may host the various network components of the computing resource network 102, such as, for example, a hub node 106, a spoke 108(1)-(N), a spoke network 112(1)-(N), and/or one or more tenant node(s) 114(1)-(N), where N may be any integer greater than 1.

Each of the spokes 108 may provide a hub node 106 of a given site 104 access to a spoke network 112 hosting one or more tenant node(s) 114. For example, a first hub node 106(A) provisioned in a first site 104(A) of the computing resource network 102 may be configured to route network traffic associated with a first spoke 108(1) and/or a second spoke 108(2) provisioned in the first site 104(A), such as, for example, network traffic originating from and/or destined to one or more tenant nodes 114(1), 114(2) hosted in one or more spoke networks 112(1), 112(2). Additionally, or alternatively, a second hub node 106(B) provisioned in a second site 104(B) of the computing resource network 102 may be configured to route network traffic associated with a third spoke 108(3) and/or a fourth spoke 108(4) provisioned in the second site 104(B), such as, for example, network traffic originating from and/or destined to one or more tenant nodes 114(3), 114(4) hosted in one or more spoke networks 112(3), 112(4). Additionally, or alternatively, the first hub node 106(A), the second hub node 106(B), and/or one or more third hub node(s) 106(N) may be communicatively coupled, such that they are configured to send network traffic to a given hub node 106 configured to route the network traffic to a destination spoke 110 provisioned in the same network site of the given hub node 106.

Additionally, or alternatively, each of the sites 104 may offer one or more services 116 implemented by way of a hub node 106 provisioned in a given site 104. In some examples, the one or more services 116 may comprise a deep packet inspection (DPI) service, a cloud-delivered firewall (CDFW) service, a network address translation (NAT) service, a secure web gateway (SWG) service, a domain name service (DNS) layer security service, and/or a cloud access security broker (CASB) service.

Take, for example, the computing resource network 102 configured as a hub and spoke overlay multiprotocol label switching (MPLS) network. As previously described, hub node A 106(A) may be configured to route network traffic associated with one or more spoke(s) 108(1), 108(2) provisioned in network site A 104(A) and/or hub node B 106(B) may be configured to route network traffic associated with one or more spoke(s) 108(3), 108(4) provisioned in network site B 104(B). That is, network traffic, destined for one or more tenant node(s) 114(1), 114(2) hosted in respective spoke network(s) 112(1), 112(2) connected to hub node A 106(A) by way of the spoke(s) 108(1), 108(2) provisioned in site A 104(A) and from one or more tenant nodes 114(3)-(N) hosted in respective spoke network(s) 112(3)-(N) and connected to respective hub node(s) 106(B), 106(N) by way of the spoke(s) 108(3)-(N), is received at hub node A 106(A) and routed to the spoke 108 connected to the spoke network 112 hosting the destination tenant node 114. In other words, network traffic traversing the hub and spoke overlay network originating in site B 104(B) and destined for site A 104(A), is routed based on a first hop from the originating spoke 108(3), 108(4) to hub node B 106(B), a second hop from hub node B 106(B) to hub node A 106(A), and a third hop from hub node A 106(A) to the destination spoke 108(1), 108(2). However, by configuring a networking device associated with a spoke 108 to encode a border gateway protocol (BGP) large community string with network routing information associated with the spoke 108 and/or a tenant node 114, a hub node 106 may utilize the network routing information to send packets directly to a remote spoke (e.g., from hub node A 106(A) to spoke 108(3)), thus eliminating the need for 3 network hops to route network traffic across network sites of the hub and spoke overlay network.

At "5," hub node B 106(B) may receive a network advertisement from hub node A 106(A). In some examples, the network advertisement may be configured as a data packet, a BGP advertisement packet, and/or an application programming interface (API) call, such as, for example, a representational state transfer (REST) API call including details for configuring a given spoke network 112 with the computing resource network 102. Additionally, or alternatively, the network advertisement may include a BGP large community string. The BGP large community string may comprise various portions encoded with the information, such as, for example, a first 4-byte portion encoded with a tenant VNI associated with a tenant node 114(1) provisioned in the first spoke network 112(1), a second 4-byte portion encoded with an indication of a virtual network instance (VNI) type associated with the first spoke 108(1) and/or the first spoke network 112(1), and/or a third 4-byte portion encoded with an address associated with the first spoke 108(1) and/or the first spoke network 112(1) (e.g., an internet protocol (IP) address associated with the first spoke network 112(1) and/or a tunnel endpoint associated with the first spoke network 112(1)).

At "6," hub node B 106(B) may decode the network routing information from various portions of the BGP large community string. In some examples, while decoding the network routing information, hub node B 106(B) may be configured to assume that the IP address included in the third portion of the BGP large community string is an IPv4 address, unless an indication is otherwise provided. Hub node B 106(B) may be configured to determine such an indication by decoding the second portion of the BGP large community, and determining, based at least in part on the VNI type, that the tunnel endpoint associated with the first spoke 108(1) is an IPv6 address. In such examples, hub node B 106(B) may then perform a lookup, based on a 4-byte identifier encoded in the third portion of the BGP large community string (in place of the IPv4 address) to determine the IPv6 address associated with the tunnel endpoint of the first spoke network 112(1).

At "7," hub node B 106(B) may be configured to store the network routing information associated with the first spoke 108(1) and/or the tenant node 114(1) provisioned in the first spoke 108(1) as a mapping between the tenant VNI, the indication of the VNI type of the first spoke 108(1), and/or the address associated with the first spoke 108(1). Additionally, or alternatively, the mapping may include only the indication of the VNI type of the first spoke 108(1) and the address associated with the first spoke 108(1).

At "8," hub node B 106(B) may receive a packet from a source tenant node 114(4) hosted in a spoke network 112(4) connected to a second spoke 108(4) provisioned in site B 104(B), to be transmitted to a destination tenant node 114(1) hosted in a spoke network 112(1) connected to the first spoke 108(1). In some examples, the packet may include an inner header including next hop information for a destination tenant node 114(1) provisioned in a spoke network 112(1) and/or an outer header including next hop information for a given spoke 108(1) of the hub and spoke overlay network 102. Hub node B 106(B) may receive the data packet from the second spoke 108(4) and identify the network routing information associated with the first spoke 108(1) that was previously stored in the site B database 110(B).

At "9," hub node B 106(B) may be configured to leverage the network routing information associated with the first spoke 108(1) and send the data packet directly to the first spoke 108(1), without intervention by hub node A 106(A) (e.g., without routing the data packet via an extra hop from the hub node B 106(B) to hub node A 106(A)). For example, hub node B 106(B) may identify, based on the mapping stored in the Site B datastore 110(B), the tenant VNI associated with the destination node 114(1), the VNI type associated with the first spoke 108(1), and/or the address associated with the first spoke 108(1), and utilize the network routing information to send the data packet directly to the first spoke 108(1), thus eliminating an additional network hop by foregoing sending the data packet to hub node A 106(A) associated with the first spoke 108(1).

Figure 2:
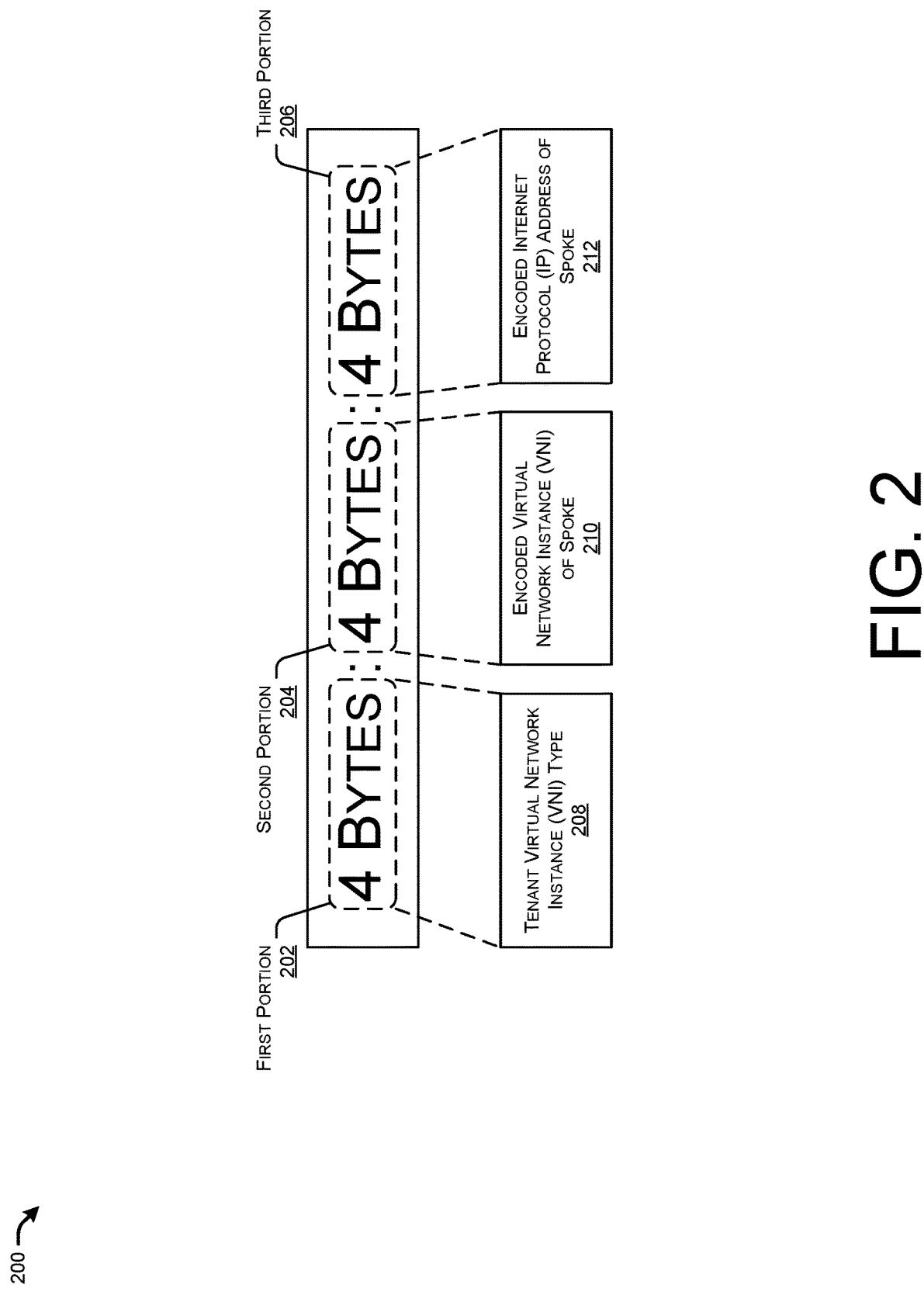
FIG. 2 illustrates an example border gateway protocol (BGP) large community including three 4-byte sections indicating a tenant virtual network instance (VNI), an encoded VNI type of a spoke, and/or address of a tunnel endpoint associated with an originating spoke.

FIG. 2 illustrates an example border gateway protocol (BGP) large community string 200 including a first 4-byte portion 202, a second 4-byte portion 204, and/or a third 4-byte portion 206. In some examples, the portions 202, 204, and/or 206 of the BGP large community string 200 may indicate an encoded tenant VNI 208 associated with a tenant node provisioned in a spoke network, an encoded VNI type and/or VNI associated with a spoke 210, and/or an encoded internet protocol (IP) address 212 associated with a spoke.

As described with respect to FIGS. 1A and 1B, one or more routing device(s) associated with a given spoke network may receive a tenant VNI for a given tenant node in the spoke network and may encode the first 4-byte portion of the BGP large community string with the tenant VNI. The tenant VNI may be configured as a VNI label used for tenant traffic, such as, for example, MPLS, VXLAN, GENEVE, and/or any other network overlay protocol. Additionally, or alternatively, the first 4-byte portion may be configured as a reserved 4-byte portion of the BGP large community string. Additionally, or alternatively, the one or more routing device(s) may encode the second 4-byte portion of the BGP large community string with an indication of the VNI type of the given spoke, such as, for example, MPLS, VXLAN, GENEVE, and/or any other network overlay protocol. Additionally, or alternatively, the one or more routing device(s) may encode the third 4-byte portion of the BGP large community string with an IP version 4 (IPv4) address and/or an identifier of an IP version 6 (IPv6) address of a network tunnel endpoint associated with the given spoke (or the one or more routing devices provisioned in the given spoke network). In examples where the network tunnel endpoint is an IPv6 address, the IPv6 address may be mapped to a 4-byte identifier. By encoding the network routing information into a BGP large community string in this way, a given hub node may be configured to perform a lookup using the 4-byte identifier to determine the IPv6 address of the tunnel endpoint based on the VNI type included in the second portion of the BGP large community string indicating that the VNI type of a given spoke is a VNI configured for IPv6 routing.

Figure 3:
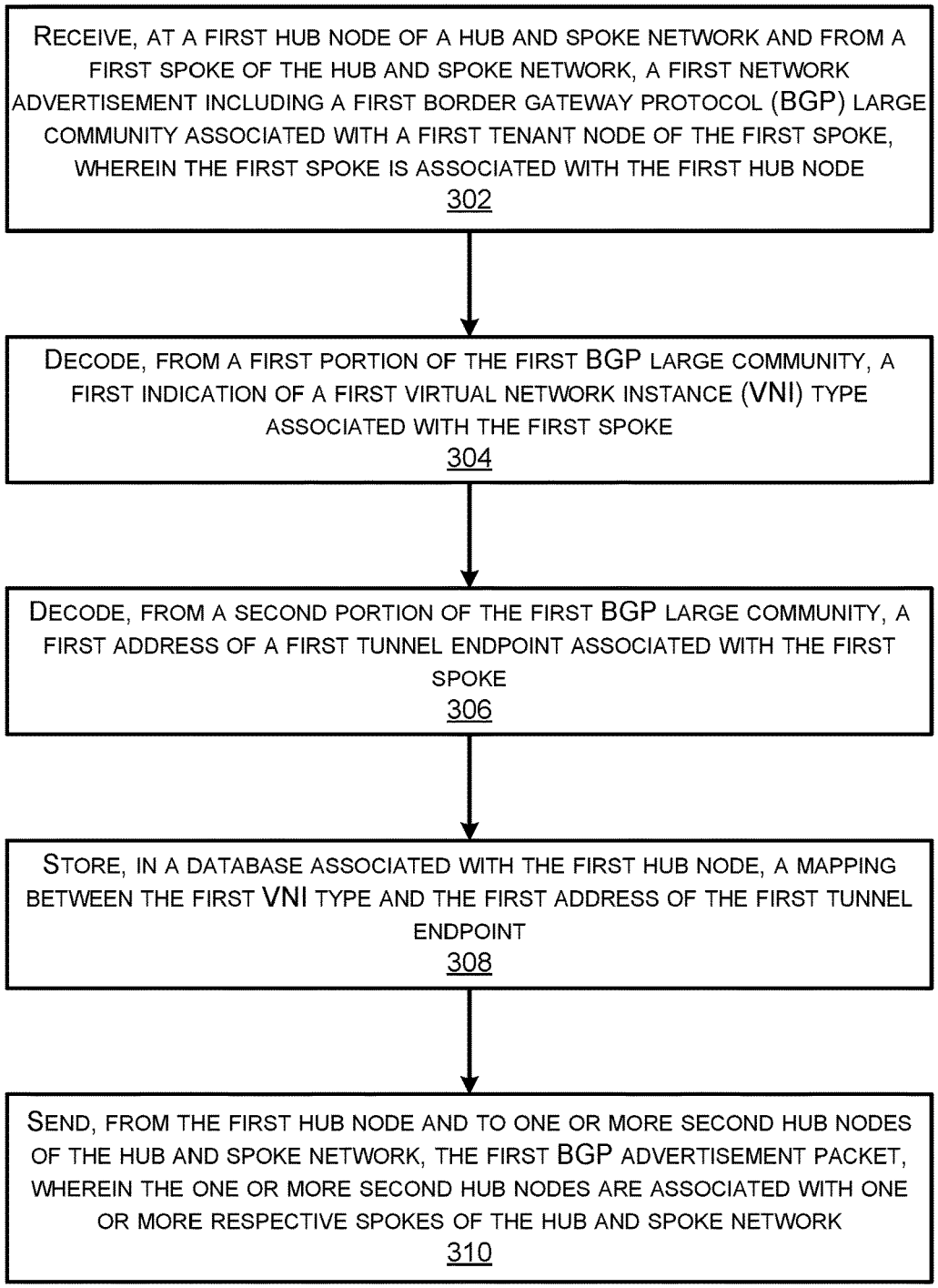
FIG. 3 illustrates a flow diagram of an example method for a first hub node of a hub and spoke overlay network to receive a border gateway protocol (BGP) advertisement packet from a local spoke and forward the BGP advertisement packet to a second hub node in the hub and spoke overlay network and remote from the first hub node.
Figure 4:
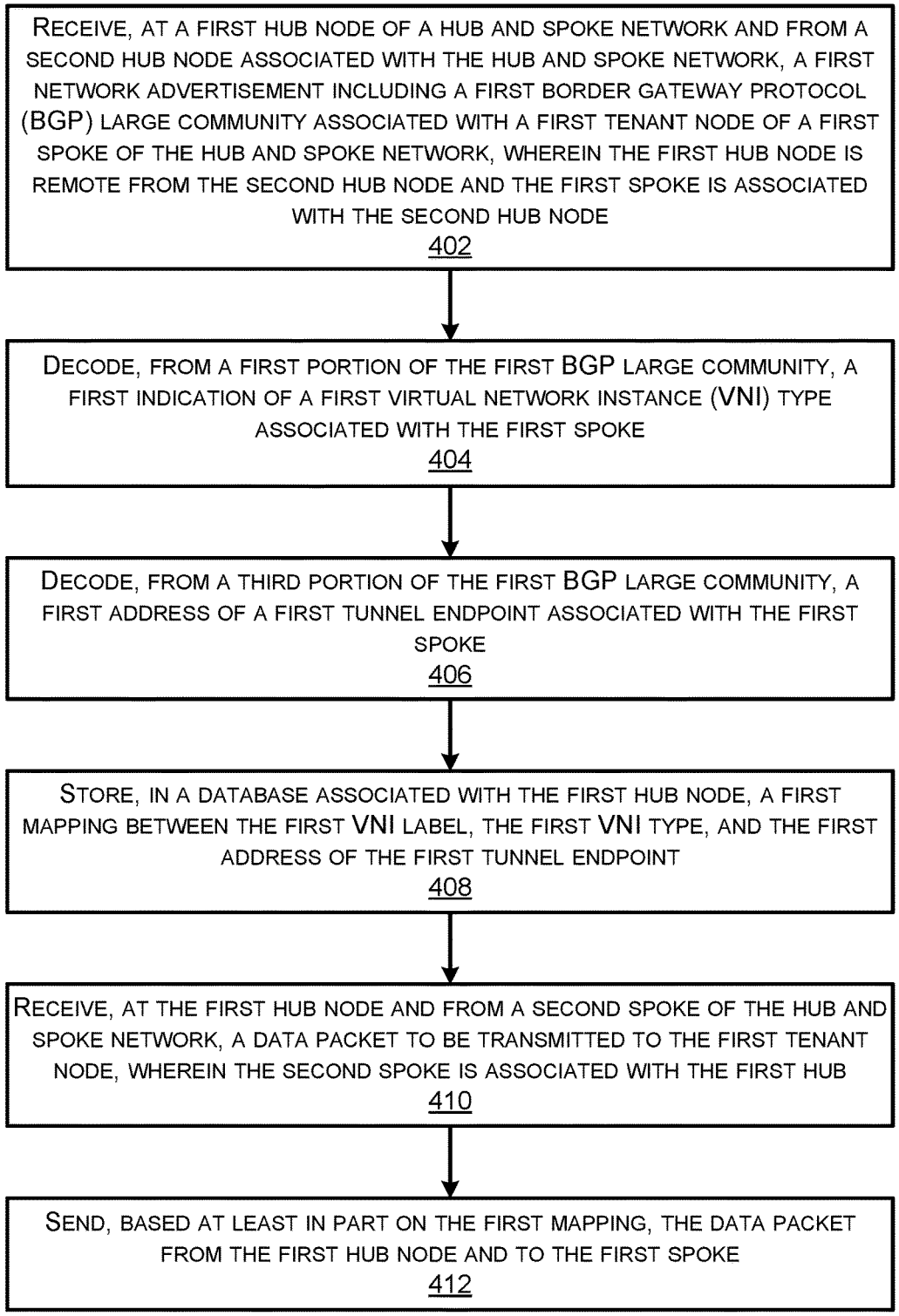
FIG. 4 illustrates a flow diagram of an example method for a first hub node of a hub and spoke overlay network to send data packets from a source node of a first spoke local to the first hub node directly to a destination node of a second spoke connected to a second hub node and remote from the first hub node.

FIGS. 3 and 4 illustrate flow diagrams of example methods 300 and 400 and that illustrate aspects of the functions performed at least partly by the computing resource network 102, the hub node(s) 106, the spoke(s) 108, the site database(s) 110, and/or the spoke network(s) 112 as described in FIGS. 1A and 1B. The logical operations described herein with respect to FIGS. 3 and 4 may be implemented (1) as a sequence of computer-implemented acts or program modules running on a computing system and/or (2) as interconnected machine logic circuits or circuit modules within the computing system. In some examples, the method(s) 300 and/or 400 may be performed by a system comprising one or more processors and one or more non-transitory computer-readable media storing computer-executable instructions that, when executed by the one or more processors, cause the one or more processors to perform the method(s) 300 and/or 400.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 3 and 4 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 3 illustrates a flow diagram of an example method 300 for a first hub node provisioned in a first site of a computing resource network (e.g., a hub and spoke overlay network) to receive a border gateway protocol (BGP) advertisement packet from a local spoke and forward the BGP advertisement packet to a second hub node provisioned in a second site that is remote from the first site. In some examples, the computing resource network, the first site, the second site, the first hub node, the second hub node, and/or the local spoke may be configured as the computing resource network 102, site A 104(A), site B 104(B), hub node A 106(A), hub node B 106(B), and/or the first spoke 108(1) as described with respect to FIG. 1A, respectively.

At 302, the method 300 includes receiving, at a first hub node of a hub and spoke network and from a first spoke of the hub and spoke network, a first network advertisement including a first border gateway protocol (BGP) large community associated with a first tenant node of the first spoke. In some examples, the first spoke may be associated with the first hub node, such that the first hub node is configured to router network traffic to and/or from the first spoke. Additionally, or alternatively, the BGP large community may be configured as the BGP large community string 200 as described with respect to FIG. 2.

At 304, the method 300 includes decoding, from a first portion of the first BGP large community, a first indication of a first virtual network instance (VNI) type associated with the first spoke. In some examples, the first hub node may be configured to decode the first indication of the first VNI type associated with the first spoke from the first BGP large community. Additionally, or alternatively, the first portion and/or the first indication of the first VNI type may correspond to the second portion 204 and/or the encoded VNI of spoke 210 as described with respect to FIG. 2, respectively.

At 306, the method 300 includes decoding, from a second portion of the first BGP large community, a first address of a first tunnel endpoint associated with the first spoke. In some examples, the first hub node may be configured to decode the first address of the first tunnel endpoint associated with the first spoke from the first BGP large community. Additionally, or alternatively, the second portion and/or the first address of the first tunnel endpoint may correspond to the third portion 206 and/or the encoded IP address of the spoke 212 as described with respect to FIG. 2, respectively.

At 308, the method 300 includes storing a mapping between the first VNI type and/or the first address of the first tunnel endpoint. In some examples, the mapping may be stored in a database associated with the first hub node.

At 310, the method 300 includes sending, from the first hub node and to one or more second hub nodes of the hub and spoke network, the first network advertisement. In some examples, the one or more second hub nodes may be associated with one or more respective spokes of the hub and spoke network.

In some examples, the first address of the first tunnel endpoint may be an Internet Protocol version 4 (IPv4) address.

In some examples, the first address of the first tunnel endpoint may include an indication of an Internet Protocol version 6 (IPv6) address. In some examples, the IPv6 address may be mapped to a 4-byte identifier (e.g., the indication). Additionally, or alternatively, the first hub node may be configured to perform a lookup using the 4-byte identifier to determine the IPv6 address of the first tunnel endpoint based on the VNI type included in the second portion of the BGP large community indicating that the VNI type of the first spoke is a VNI configured for IPv6 routing.

In examples where the network tunnel endpoint is an IPv6 address. In such examples, a given hub node 106 may be configured to perform a lookup using the 4-byte identifier to determine the IPv6 address of the tunnel endpoint based on the VNI type included in the second portion of the BGP large community string indicating that the VNI type of a given spoke 108 is a VNI configured for IPv6 routing.

Additionally, or alternatively, the method 300 includes receiving, at the first hub node and from a second hub node of the one or more second hub nodes, a second BGP advertisement packet including a second BGP large community associated with a second tenant node of a second spoke of the hub and spoke network. In some examples, the second spoke may be associated with the second hub node, such that the second hub node may be configured to route network traffic to and/or from the second spoke. Additionally, or alternatively, the method 300 includes decoding, from a first portion of the second BGP large community, a second indication of a second VNI type associated with the second spoke. Additionally, or alternatively, the method 300 includes decoding, from a second portion of the second BGP large community, a second address of a second tunnel endpoint associated with the second spoke. Additionally, or alternatively, the method 300 includes storing, in the database associated with the first hub node, a second mapping between the second VNI type and the second address of the second tunnel endpoint. Additionally, or alternatively, the method 300 includes receiving, at the first hub node and from the first spoke, a data packet to be transmitted to the second tenant node. Additionally, or alternatively, the method 300 includes sending, based at least in part on the second mapping, the data packet from the first hub node and to the second spoke.

Additionally, or alternatively, the method 300 includes receiving the second data packet at the second spoke and from the first hub node.

In some examples, the second hub node may be configured to transmit network traffic associated with the second spoke and/or the data packet may be sent from the first hub node directly to the second spoke.

FIG. 4 illustrates a flow diagram of an example method 400 for a first hub node provisioned in a first site of a computing resource network (e.g., a hub and spoke overlay network) having local spokes connected thereto to receive a border gateway protocol (BGP) advertisement packet from a second hub node provisioned in a second site of the network, and send data packets from a source node of one of the local spoke(s) directly to a destination node of a remote spoke connected to the second hub node in the second site. In some examples, the first hub node and/or the first site may be configured as hub node B 106(B) and/or site B 104(B) as described with respect to FIG. 1B, respectively. Additionally, or alternatively, the second hub node and/or the second site may be configured as hub node A 106(A) and/or site B 104(B) as described with respect to FIG. 1B, respectively. Additionally, or alternatively, the computing resource network and/or the local spoke(s) may be configured as the computing resource network 102 and/or the spokes 108(3), 108(4) as described with respect to FIG. 1B, respectively.

At 402, the method 400 includes receiving, at a first hub node of a hub and spoke network and from a second hub node associated with the hub and spoke network, a first border gateway protocol (BGP) advertisement packet. In some examples, the first BGP advertisement packet may include a first BGP large community associated with a first tenant node of a first spoke of the hub and spoke network. Additionally, or alternatively, the first hub node may be remote from the second hub node and/or the first spoke may be associated with the second hub node. Additionally, or alternatively, the BGP large community may be configured as the BGP large community string 200 as described with respect to FIG. 2.

At 404, the method 400 includes decoding, from a first portion of the first BGP large community, a first indication of a first VNI type associated with the first spoke. In some examples, the first hub node may be configured to decode the first indication of the first VNI type associated with the first spoke from the first BGP large community. Additionally, or alternatively, the first portion and/or the first indication of the first VNI type may correspond to the second portion 204 and/or the encoded VNI of spoke 210 as described with respect to FIG. 2, respectively.

At 406, the method 400 includes decoding, from a second portion of the first BGP large community, a first address of a first tunnel endpoint associated with the first spoke. In some examples, the first hub node may be configured to decode the first address of the first tunnel endpoint associated with the first spoke from the first BGP large community. Additionally, or alternatively, the second portion and/or the first address of the first tunnel endpoint may correspond to the third portion 206 and/or the encoded IP address of the spoke 212 as described with respect to FIG. 2, respectively.

At 408, the method 400 includes storing a first mapping between the first VNI type and/or the first address of the first tunnel endpoint. In some examples, the mapping may be stored in a database associated with the first hub node.

At 410, the method 400 includes receiving, at the first hub node and from a second spoke of the hub and spoke network, a data packet to be transmitted to the first tenant node. In some examples, the second spoke may be associated with the first hub, such that the first hub may be configured to route network traffic to and/or from the second spoke. In some examples, the packet may include an inner header including next hop information for a destination tenant node provisioned in a spoke network and/or an outer header including next hop information for a given spoke node of the hub and spoke overlay network.

At 412, the method 400 includes sending the data packet from the first hub node and to the first spoke. In some examples, sending the data packet from the first hub node and to the first spoke may be based at least in part on the first mapping.

In some examples, the first address of the first tunnel endpoint may be an Internet Protocol version 4 (IPv4) address.

In some examples, the first address of the first tunnel endpoint may include an indication of an Internet Protocol version 6 (IPv6) address. In some examples, the IPv6 address may be mapped to a 4-byte identifier (e.g., the indication). Additionally, or alternatively, the first hub node may be configured to perform a lookup using the 4-byte identifier to determine the IPv6 address of the first tunnel endpoint based on the VNI type included in the second portion of the BGP large community indicating that the VNI type of the first spoke is a VNI configured for IPv6 routing.

In some examples, the second hub node may be configured to transmit network traffic associated with the first spoke and/or the data packet may be sent from the first hub node directly to the first spoke.

In some examples, the first hub node may be configured to transmit network traffic associated with the second spoke.

Additionally, or alternatively, the method 400 includes receiving, at the first hub node and from the second spoke, a second BGP advertisement packet including a second BGP large community associated with the second tenant node. Additionally, or alternatively, the method 400 includes decoding, from a first portion of the second BGP large community, a second indication of a second VNI type associated with the second spoke. Additionally, or alternatively, the method 400 includes decoding, from a second portion of the second BGP large community, a second address of a second tunnel endpoint associated with the second spoke. Additionally, or alternatively, the method 400 includes storing, in the database associated with the first hub node, a second mapping between the second VNI type and the second address of the second tunnel endpoint. Additionally, or alternatively, the method 400 includes sending, from the first hub node and to the second hub node, the second BGP advertisement packet.

In some examples, the data packet may be a first data packet. Additionally, or alternatively, the method 400 may include receiving a second data packet at the second spoke and from the second hub node.

Additionally, or alternatively, the method 400 may include sending the second BGP advertisement packet from the first hub node and to one or more third hub nodes associated with the hub and spoke network.

In some examples, the hub and spoke network may be an overlay network.

Figure 5:
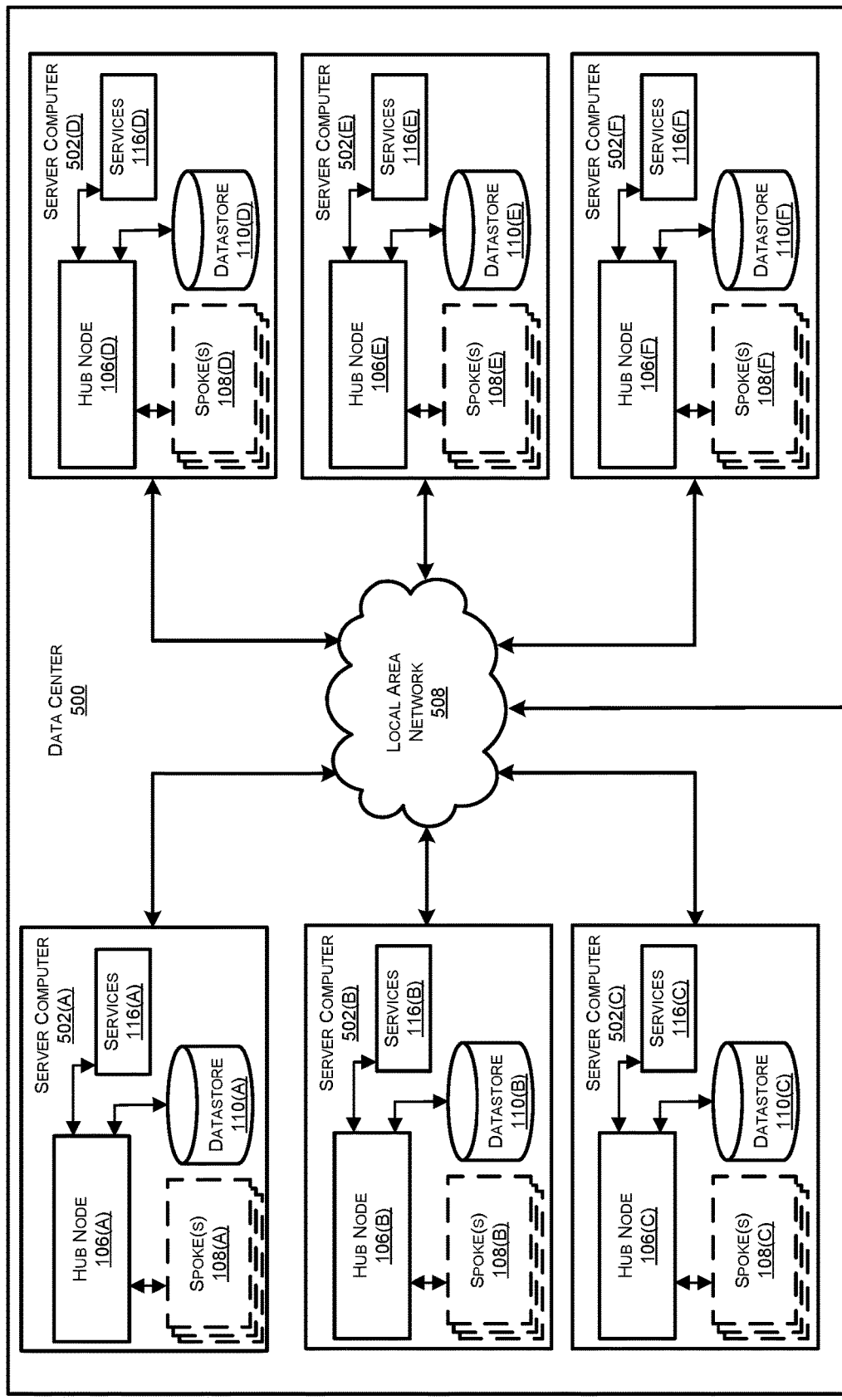
FIG. 5 illustrates a computing system diagram illustrating a configuration for a data center that can be utilized to implement aspects of the technologies disclosed herein.

FIG. 5 is a computing system diagram illustrating a configuration for a data center 500 that can be utilized to implement aspects of the technologies disclosed herein. The example data center 500 shown in FIG. 5 includes several server computers 502A-502E (which might be referred to herein singularly as "a server computer 502" or in the plural as "the server computers 502") for providing computing resources. In some examples, the server computers 502 may include, or correspond to, the servers associated with the data center 104 described herein with respect to FIG. 1.

The server computers 502 can be standard tower, rackmount, or blade server computers configured appropriately for providing the computing resources described herein. As mentioned above, the computing resources provided by the computing resource network 102 can be data processing resources such as VM instances or hardware computing systems, database clusters, computing clusters, storage clusters, data storage resources, database resources, networking resources, and others. Some of the servers 502 can also be configured to execute a resource manager capable of instantiating and/or managing the computing resources. In the case of VM instances, for example, the resource manager can be a hypervisor or another type of program configured to enable the execution of multiple VM instances on a single server computer 502. Server computers 502 in the data center 500 can also be configured to provide network services and other types of services.

In the example data center 500 shown in FIG. 5, an appropriate LAN 508 is also utilized to interconnect the server computers 502A-502E. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 500, between each of the server computers 502A-502E in each data center 500, and, potentially, between computing resources in each of the server computers 502. It should be appreciated that the configuration of the data center 500 described with reference to FIG. 5 is merely illustrative and that other implementations can be utilized.

In some examples, the server computers 502 may each execute a hub node 106 one or more spoke(s) 108, one or more datastore(s) 110, and/or one or more services 116.

In some instances, the computing resource network 102 may provide computing resources, like application containers, VM instances, and storage, on a permanent or an as-needed basis. Among other types of functionality, the computing resources provided by the computing resource network 102 may be utilized to implement the various services described above. The computing resources provided by the computing resource network 102 can include various types of computing resources, such as data processing resources like application containers and VM instances, data storage resources, networking resources, data communication resources, network services, and the like.

Each type of computing resource provided by the computing resource network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The computing resources network 102 can also be configured to provide other types of computing resources not mentioned specifically herein.

The computing resources provided by the computing resource network 102 may be enabled in one embodiment by one or more data centers 500 (which might be referred to herein singularly as "a data center 500" or in the plural as "the data centers 500"). The data centers 500 are facilities utilized to house and operate computer systems and associated components. The data centers 500 typically include redundant and backup power, communications, cooling, and security systems. The data centers 500 can also be located in geographically disparate locations. One illustrative embodiment for a data center 500 that can be utilized to implement the technologies disclosed herein will be described below with regard to FIG. 6.

Figure 6:
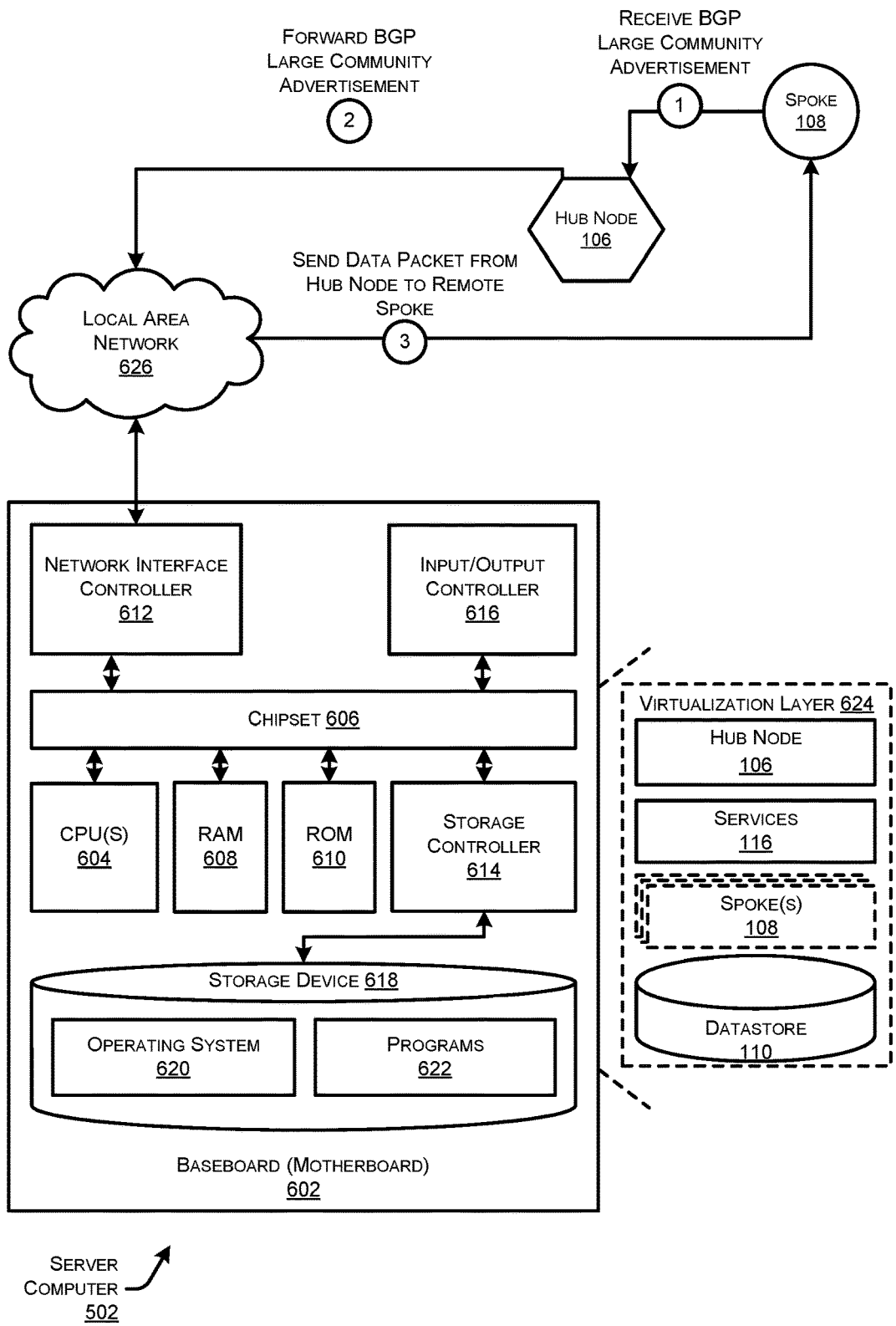
FIG. 6 is a computer architecture diagram showing an illustrative computer hardware architecture for implementing a server device that can be utilized to implement aspects of the various technologies presented herein.

FIG. 6 shows an example computer architecture for a computing device (or network routing device) 502 capable of executing program components for implementing the functionality described above. The computer architecture shown in FIG. 6 illustrates a conventional server computer, workstation, desktop computer, laptop, tablet, network appliance, e-reader, smartphone, or other computing device, and can be utilized to execute any of the software components presented herein. The computing device 502 may, in some examples, correspond to a physical server of a data center described herein with respect to FIGS. 1A and/or FIG. 1B.

The computing device 502 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computing device 502.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computing device 502. The chipset 606 can further provide an interface to a computer-readable storage medium such as a read-only memory ("ROM") 610 or non-volatile RAM ("NVRAM") for storing basic routines that help to startup the computing device 502 and to transfer information between the various components and devices. The ROM 610 or NVRAM can also store other software components necessary for the operation of the computing device 502 in accordance with the configurations described herein.

The computing device 502 can operate in a networked environment using logical connections to remote computing devices and computer systems through a network, such as the network 626. The chipset 606 can include functionality for providing network connectivity through a NIC 612, such as a gigabit Ethernet adapter. The NIC 612 is capable of connecting the computing device 502 to other computing devices over the network 626. It should be appreciated that multiple NICs 612 can be present in the computing device 502, connecting the computer to other types of networks and remote computer systems.

The computing device 502 can be connected to a storage device 618 that provides non-volatile storage for the computing device 502. The storage device 618 can store an operating system 620, programs 622, and data, which have been described in greater detail herein. The storage device 618 can be connected to the computing device 502 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 502 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computing device 502 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 502 can further read information from the storage device 618 by detecting the physical states or characteristics of one or more particular locations within the physical storage units.

In addition to the mass storage device 618 described above, the computing device 502 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 502. In some examples, the operations performed by the computing resource network 102, and or any components included therein, may be supported by one or more devices similar to computing device 502. Stated otherwise, some or all of the operations performed by the computing resource network 102, and or any components included therein, may be performed by one or more computing device 502 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computing device 502. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the computing device 502.

In one embodiment, the storage device 618 or other computer-readable storage media is encoded with computer-executable instructions which, when loaded into the computing device 502, transform the computer from a general-purpose computing system into a special-purpose computer capable of implementing the embodiments described herein. These computer-executable instructions transform the computing device 502 by specifying how the CPUs 604 transition between states, as described above. According to one embodiment, the computing device 502 has access to computer-readable storage media storing computer-executable instructions which, when executed by the computing device 502, perform the various processes described above with regard to FIGS. 1A, 1B, 3, and/or 4. The computing device 502 can also include computer-readable storage media having instructions stored thereupon for performing any of the other computer-implemented operations described herein.

The computing device 502 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computing device 502 might not include all of the components shown in FIG. 6, can include other components that are not explicitly shown in FIG. 6, or might utilize an architecture completely different than that shown in FIG. 6.

The server computer 502 may support a virtualization layer 624, such as one or more components associated with the computing resource network 102, such as, for example, the hub node 106, the service(s) 116, the spoke(s) 108, and/or the data store 110. At "1," a first hub node 106 may receive a BGP large community advertisement packet and/or a packet including a BGP large community string from a first spoke local to the first hub node. The first hub node 106 may decode network routing information from various portions of the BGP large community string and/or store the network routing information. At "2," the first hub node may forward the packet, including the BGP large community string, to a second hub node 106 that is remote from the first hub node 106 (e.g., provisioned in a network site separate from the first hub node 106). The second hub node 106 may decode network routing information from various portions of the BGP large community string and/or store the network routing information in a datastore 110 associated with the second hub node 106. At "3," the second hub node 106 may receive a data packet from a second spoke 108 local to the second hub node 106, and the second hub node 106 may send the data packet from the second hub node 106 directly to the first spoke 108 that is remote from the second hub node 106, based on the network routing information associated with the first spoke stored in the datastore 110 associated with the second hub node 106.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   receiving, at a first hub node of a hub and spoke network and from a first spoke of the hub and spoke network, a first network advertisement including a first border gateway protocol (BGP) large community associated with a first tenant node of the first spoke, wherein the first spoke is associated with the first hub node;
   decoding, from a first portion of the first BGP large community, a first indication of a first virtual network instance (VNI) type associated with the first spoke;

decoding, from a second portion of the first BGP large community, a first address of a first tunnel endpoint associated with the first spoke;

storing, in a database associated with the first hub node, a mapping between the first VNI type and the first address of the first tunnel endpoint; and sending, from the first hub node and to one or more second hub nodes of the hub and spoke network, the first network advertisement, wherein the one or more second hub nodes are associated with one or more respective spokes of the hub and spoke network.

2. The method of claim 1, wherein the first address of the first tunnel endpoint is an Internet Protocol version 4 (IPv4) address.

3. The method of claim 1, wherein the first address of the first tunnel endpoint includes an indication of an Internet Protocol version 6 (IPv6) address.

4. The method of claim 1, further comprising:

receiving, at the first hub node and from a second hub node of the one or more second hub nodes, a second network advertisement including a second BGP large community associated with a second tenant node of a second spoke of the hub and spoke network, wherein the second spoke is associated with the second hub node;

decoding, from a first portion of the second BGP large community, a second indication of a second VNI type associated with the second spoke;

decoding, from a second portion of the second BGP large community, a second address of a second tunnel endpoint associated with the second spoke;

storing, in the database associated with the first hub node, a second mapping between the second VNI type and the second address of the second tunnel endpoint;

receiving, at the first hub node and from the first spoke, a data packet to be transmitted to the second tenant node; and sending, based at least in part on the second mapping, the data packet from the first hub node and to the second spoke.

5. The method of claim 4, further comprising receiving the second data packet at the second spoke and from the first hub node.

6. The method of claim 4, wherein the second hub node is configured to transmit network traffic associated with the second spoke and the data packet is sent from the first hub node directly to the second spoke.

7. A system comprising:

one or more processors; and one or more non-transitory computer-readable media storing computer-executable instructions that, when executed by the one or more processors, cause the one or more processors to perform operations comprising:

receiving, at a first hub node of a hub and spoke network and from a second hub node associated with the hub and spoke network, a first network advertisement including a first border gateway protocol (BGP) large community associated with a first tenant node of a first spoke of the hub and spoke network, wherein the first hub node is remote from the second hub node and the first spoke is associated with the second hub node;

decoding, from a first portion of the first BGP large community, a first indication of a first virtual network instance (VNI) type associated with the first spoke;

decoding, from a second portion of the first BGP large community, a first address of a first tunnel endpoint associated with the first spoke;

storing, in a database associated with the first hub node, a first mapping between the first VNI type and the first address of the first tunnel endpoint;

receiving, at the first hub node and from a second spoke of the hub and spoke network, a data packet to be transmitted to the first tenant node, wherein the second spoke is associated with the first hub; and sending, based at least in part on the first mapping, the data packet from the first hub node and to the first spoke.

8. The system of claim 7, wherein the first address of the first tunnel endpoint is an Internet Protocol version 4 (IPv4) address.

9. The system of claim 7, wherein the first address of the first tunnel endpoint includes an indication of an Internet Protocol version 6 (IPv6) address.

10. The system of claim 7, wherein the second hub node is configured to transmit network traffic associated with the first spoke and the data packet is sent from the first hub node directly to the first spoke.

11. The system of claim 7, wherein the first hub node is configured to transmit network traffic associated with the second spoke, and the operations further comprising:

receiving, at the first hub node and from the second spoke, a second network advertisement including a second BGP large community associated with the second tenant node;

decoding, from a first portion of the second BGP large community, a second indication of a second VNI type associated with the second spoke;

decoding, from a second portion of the second BGP large community, a second address of a second tunnel endpoint associated with the second spoke;

storing, in the database associated with the first hub node, a second mapping between the second VNI type and the second address of the second tunnel endpoint; and sending, from the first hub node and to the second hub node, the second network advertisement.

12. The system of claim 11, wherein the data packet is a first data packet, and the operations further comprising receiving a second data packet at the second spoke and from the second hub node.

13. The system of claim 11, the operations further comprising sending the second network advertisement from the first hub node and to one or more third hub nodes associated with the hub and spoke network.

14. The system of claim 7, wherein the hub and spoke network is an overlay network.

15. A method comprising:

receiving, at a first hub node of a hub and spoke network and from a second hub node associated with the hub and spoke network, a first network advertisement including a first border gateway protocol (BGP) large community associated with a first tenant node of a first spoke of the hub and spoke network, wherein the first hub node is remote from the second hub node and the first spoke is associated with the second hub node;

decoding, from a first portion of the first BGP large community, a first indication of a first virtual network instance (VNI) type associated with the first spoke;

decoding, from a second portion of the first BGP large community, a first address of a first tunnel endpoint associated with the first spoke;

storing, in a database associated with the first hub node, a first mapping between the first VNI type and the first address of the first tunnel endpoint;

receiving, at the first hub node and from a second spoke of the hub and spoke network, a data packet to be transmitted to the first tenant node, wherein the second spoke is associated with the first hub; and sending, based at least in part on the first mapping, the data packet from the first hub node and to the first spoke.

16. The method of claim 15, wherein the first address of the first tunnel endpoint is an Internet Protocol version 4 (IPv4) address.

17. The method of claim 15, wherein the first address of the first tunnel endpoint includes an indication of an Internet Protocol version 6 (IPv6) address.

18. The method of claim 15, wherein the second hub node is configured to transmit network traffic associated with the first spoke and the data packet is sent from the first hub node directly to the first spoke.

19. The method of claim 15, wherein the first hub node is configured to transmit network traffic associated with the second spoke, and the method further comprising:

receiving, at the first hub node and from the second spoke, a second network advertisement including a second BGP large community associated with the second tenant node;

decoding, from a first portion of the second BGP large community, a second indication of a second VNI type associated with the second spoke;

decoding, from a second portion of the second BGP large community, a second address of a second tunnel endpoint associated with the second spoke;

storing, in the database associated with the first hub node, a second mapping between the second VNI type and the second address of the second tunnel endpoint; and sending, from the first hub node and to the second hub node, the second network advertisement.

20. The method of claim 19, wherein the data packet is a first data packet, and the method further comprising receiving a second data packet at the second spoke and from the second hub node.

* * * * *